United States Patent [19]

Okamura

[11] 4,422,550
[45] Dec. 27, 1983

[54] STRUCTURE OF PIVOTAL-SHAFT RECEIVING HOLE OF THIN-WALLED MOLDING PRODUCT

[75] Inventor: Masatoshi Okamura, Tokyo, Japan

[73] Assignee: TDK Electronics Co., Ltd., Tokyo, Japan

[21] Appl. No.: 279,798

[22] Filed: Jul. 2, 1981

[30] Foreign Application Priority Data

Aug. 4, 1980 [JP] Japan .................................. 55-109777

[51] Int. Cl.³ .......................................... B65D 85/672
[52] U.S. Cl. ..................................... 206/387; 16/126; 403/12; 411/500
[58] Field of Search ................... 206/387, 444; 16/126; 220/338, 91; 403/12; 411/500; 428/35, 131, 137–140

[56] References Cited

U.S. PATENT DOCUMENTS

| | | | |
|---|---|---|---|
| 3,620,361 | 11/1971 | Fugiwara et al. | 206/387 |
| 3,638,788 | 2/1972 | Solomon | 206/387 |
| 3,915,363 | 10/1975 | Frankenberg | 220/91 X |
| 4,118,616 | 10/1978 | Wittkamp et al. | 206/387 |
| 4,204,724 | 5/1980 | Bauer et al. | 206/387 X |
| 4,211,337 | 7/1980 | Weavers et al. | 206/387 X |
| 4,291,800 | 9/1981 | Okamura et al. | 206/387 |

FOREIGN PATENT DOCUMENTS 1397302 3/1965 France ................................... 220/91

*Primary Examiner*—Henry F. Epstein
*Attorney, Agent, or Firm*—Oblon, Fisher, Spivak, McClelland & Maier

[57] ABSTRACT

A pivotal-shaft receiving hole formed in a thin-walled one-piece molded product for receiving a pivotal-shaft of another molded product is formed by a boss formed in one piece with the thin wall of said molded product and the pivotal-shaft receiving hole having a length greater than that of said pivotal-shaft which is formed through said thin wall and said boss.

2 Claims, 4 Drawing Figures

U.S. Patent  Dec. 27, 1983  4,422,550
FIG. 1
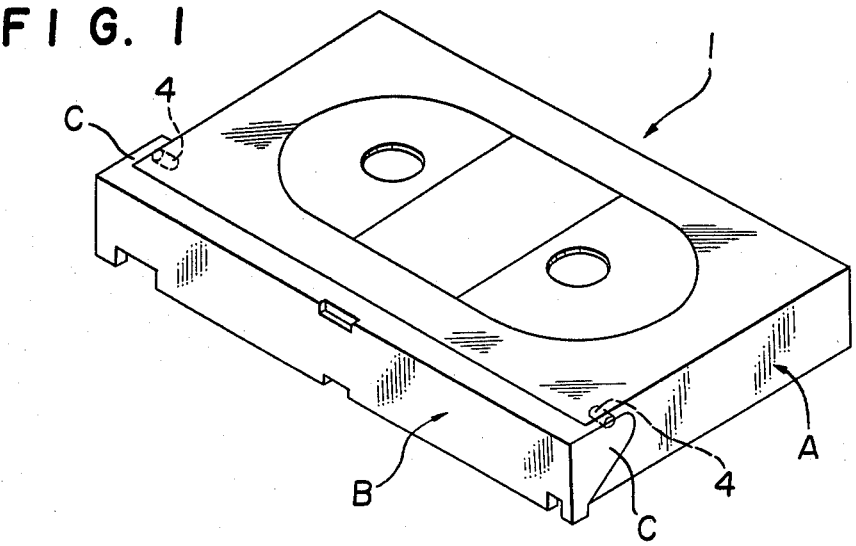
FIG. 2
FIG. 3
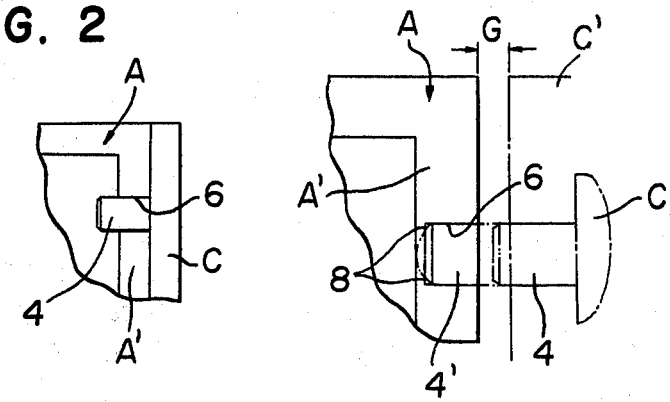
FIG. 4
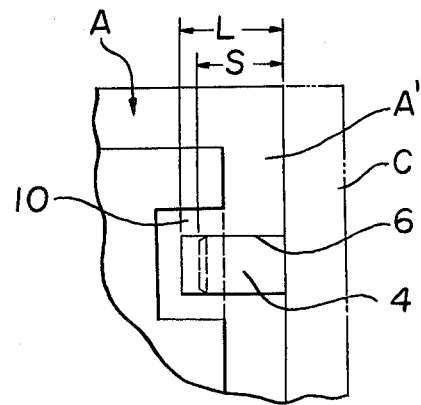

STRUCTURE OF PIVOTAL-SHAFT RECEIVING HOLE OF THIN-WALLED MOLDING PRODUCT

BACKGROUND OF THE INVENTION

1. Field of the Invention

The present invention relates to an improved structure of a pivotal-shaft receiving hole in a molded product having a thin wall such as a magnetic tape cassette.

2. Description of the Prior Arts

A product having a thin wall is generally fabricated by injection molding of synthetic resin. When a pair of molded products which are to be assembled with a pivotal connection are prepared, a pair of pivotal-shafts are formed in one piece and a pair of holes for receiving the shaft are formed in the other piece and both pieces are assembled by fitting the pivotal-shafts into each of the holes so as to be pivotally moved. However, with a metallic mold pattern which produces, in injection molding of a synthetic resin, a through hole in a wall, a "burr" in a film form will be produced at the opening of the hole at the inlet portion or the opening at the outlet portion. It is quite difficult or impossible to form a through hole without any burr.

When the wall thickness of the molded product is substantially large and the depth of the hole for receiving the pivotal shaft is greater than the length of the pivotal-shaft, it is necessary to remove the burr in a film form produced at the inlet portion of the through hole whereas the burr at the outlet portion causes no trouble. Accordingly, when a thick-walled molded product is produced, a metallic molding pattern is so formed that the burr in a film form is produced at the outlet portion of the through hole, thus resulting in no trouble. However, in a thin-walled molded product such as a magnetic tape cassette, the pivotal-shaft is made longer than the through hole so that the shaft passes through the hole in order to provide a rigid shaft-hole fitting structure. In such a case, a problem of thin-film burr produced at the inlet and outlet portions arises. This problem has been overcome by removing the film-like burr produced at the inlet and outlet portions of the hole by machining to allow the pivotal-shaft to pass through the hole for receiving the shaft in assembling. However, with this process, a complicated machining is required resulting in decrease of productivity.

SUMMARY OF THE INVENTION

It is an object of the present invention to provide an improved structure of the pivotal-shaft receiving hole of a thin-walled molded product such as a magnetic tape cassette which eliminates the necessity of removing film-like burr produced at the opening when a thin-walled product is molded in one-piece form.

It is another object of the present invention to provide an improved structure of the pivotal-shaft receiving hole of a thin-walled molded product which has a simple structure and a large strength.

The foregoing and the other objects of the present invention have been attained by providing a thin-walled, one-piece molded product having a pivotal-shaft receiving hole for receiving a pivotal-shaft of another molded product in which a boss is formed in one piece with the thin wall of the molded product and a pivotal-shaft receiving hole having a length greater than that of the pivotal shaft is formed through the thin wall and the boss.

BRIEF DESCRIPTION OF THE DRAWINGS

FIG. 1 is a schematic view of a magnetic tape cassette suitable to use an improved structure of the pivotal-shaft receiving hole according to the present invention;

FIG. 2 is a partial sectional view of the conventional structure in which a pivotal shaft is fitted into the pivotal-shaft receiving hole;

FIG. 3 is an enlarged sectional view of the pivotal-shaft receiving hole before fitting of the shaft; and FIG. 4 is a partially sectional view of an embodiment of the structure of a pivotal-shaft receiving hole of the present invention.

DETAILED DESCRIPTION OF THE PREFERRED EMBODIMENTS

An embodiment of the structure of a pivotal-shaft receiving hole of a thin-walled molded product of the present invention will be described with reference to the drawings.

FIG. 1 shows a typical magnetic tape cassette as a thin-walled structure. A cassette for video tape or a cartridge (1) comprises a casing (A) as a main body holding a magnetic tape and a tape cover (B) for protecting a magnetic-tape running part at the front of the casing from mechanical damage or dust deposition. A pair of arms (C) are formed at each side of the tape cover (B) projecting to the casing (A) and a pivotal-shaft (4) is formed on each arm (C) projecting to the side of the casing (A). In the conventional magnetic tape cassette, a pivotal-shaft receiving hole (6) is formed at the position in the thin wall (A') corresponding to each of the pivotal-shafts (4) so as to pass through the thin wall (A') so that the pivotal shaft (4) penetrates each of the holes (6), thus the tape cover (B) is pivotally connected to the casing (A) as shown in FIG. 2. However, in the conventional magnetic tape cassette, a burr (8) in film form is produced at the opening on the outlet side of the pivotal-shaft receiving hole (6) and the pivotal-shaft (4) provided on the arm (C) of the tape cover (B) can not pass through the hole (6) because of the presence of the film-like burr (8) and is prevented from fitting into the hole as shown by the position of the pivotal-shaft in FIG. 3. This produces a gap (G) between the casing (A) and the arm (C) thereby resulting in poor appearance, weakening of the pivotal-connecting portion or incomplete assembling. It has, therefore, been necessary to remove the film-like burr (8) before assembling the tape cassette.

FIG. 4 shows an embodiment of the pivotal-shaft receiving hole (6) of the present invention. A projecting boss (10) is formed on each thin-walled portion where the pivotal-shaft receiving hole (6) has to be formed and the hole (6) in the thin-walled portion (A') is extended through the boss (10) so that the depth L of the pivotal-shaft receiving hole (6) is greater than the length S of the pivotal-shaft (4). With this structure, no film-like burr (8) is produced at the opening at the outlet of the hole (6) thereby preventing the blocking of the insertion of the pivotal-shaft (4) when assembled.

As described above, in accordance with the structure of a pivotal-shaft receiving hole for a molded thin-walled product of the present invention, the necessity of removing operation of the film-like burr is not required, productivity of the thin-walled molding product can be improved and the strength of the pivotal-shaft receiving hole can be increased.

What is claimed as new and desired to be secured by Letters Patent of the United States is:

1. A pivotal shaft receiving member, comprising:

a one piece molded product including a portion having a first thickness;

a boss formed on one surface of said portion of said product;

a bore for a pivotal shaft, said bore having walls defined by said portion and said boss, the depth of said bore being greater than said first thickness; and a pivotal shaft positionable in said bore, said pivotal shaft having a length greater than said first thickness and less than said depth of said bore, wherein said molded product comprises a magnetic tape cassette and wherein said shaft is fixed to a cover for said cassette.

2. The member of claim 1 wherein the walls of said bore are continuous and said bore extends into said portion and said boss from a second surface of said portion opposite said one surface.

UNITED STATES PATENT AND TRADEMARK OFFICE
CERTIFICATE OF CORRECTION

PATENT NO. : 4,422,550

DATED : December 27, 1983

INVENTOR(S) : Masatoshi Okamura et al

It is certified that error appears in the above-identified patent and that said Letters Patent is hereby corrected as shown below:

On the title page

-- [75] Please include following inventor's name and residence to Letters Patent:

Haruo Shiba of Tokyo, Japan --

Signed and Sealed this

Twenty-seventh Day of March 1984

[SEAL]

Attest:

GERALD J. MOSSINGHOFF

Attesting Officer

Commissioner of Patents and Trademarks